(12) United States Patent
Kinoshita

(10) Patent No.: US 7,992,164 B2
(45) Date of Patent: Aug. 2, 2011

(54) DIGITAL BROADCASTING RECEIVING DEVICE

(75) Inventor: Kosuke Kinoshita, Daito (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 894 days.

(21) Appl. No.: 11/998,949

(22) Filed: Dec. 3, 2007

(65) Prior Publication Data

US 2008/0134233 A1 Jun. 5, 2008

(30) Foreign Application Priority Data

Dec. 4, 2006 (JP) .................................. 2006-326861

(51) Int. Cl.
*H04N 7/16* (2006.01)
(52) U.S. Cl. ............................... 725/28; 725/27; 725/38
(58) Field of Classification Search .................... 725/25, 725/28, 27, 139, 151, 38; 348/725, 731
See application file for complete search history.

(56) References Cited

U.S. PATENT DOCUMENTS

| | | | | |
|---|---|---|---|---|
| 5,751,335 | A * | 5/1998 | Shintani | 725/25 |
| 6,700,624 | B2 * | 3/2004 | Yun | 348/555 |
| 2002/0023262 | A1 * | 2/2002 | Porter | 725/25 |
| 2007/0180462 | A1 * | 8/2007 | Shin et al. | 725/28 |

FOREIGN PATENT DOCUMENTS

| | | |
|---|---|---|
| JP | 2003-110953 | 4/2003 |
| JP | 2003-518881 | 6/2003 |
| JP | 2003-198974 | 7/2003 |
| WO | WO/01/49034 | 7/2001 |

\* cited by examiner

*Primary Examiner* — Ngoc Vu
(74) *Attorney, Agent, or Firm* — Yokoi & Co., U.S.A., Inc.; Toshiyuki Yokoi

(57) ABSTRACT

A microcomputer 18 obtains a variable RRT from a broadcast signal and stores, in a recording medium, the variable RRT in association with a physical channel; sets a viewing restriction flag for an item in the variable RRT based on an operation input from a user; applies viewing restriction to the broadcast signal when rating information indicates the level at which the viewing restriction flag has been set in the variable RRT; and, when a logical channel is not associated with the selected physical channel, tunes, as an alternative channel, a physical channel with which a logical channel has been associated in the channel map of the other tuner, and associates a variable RRT associated with the alternative channel, with the selected physical channel.

2 Claims, 9 Drawing Sheets

FIG. 2

| RATING TABLE NAME | xxx Rating | | |
|---|---|---|---|
| | TV-AA | TV-BB | TV-CC |
| | ORDER | CATEGORY | CATEGORY |
| LEVEL 0 | ... / ... | ... / ... | ... / ... |
| LEVEL 1 | UU | DD | JFK |
| LEVEL 2 | VVV | S | JJ |
| LEVEL 3 | WW | RR | PP |

FIG. 3

Format of the Rating Region Table. Source: ATSC A/65b (PSIP Specification)

| Syntax | No. of bits | Format |
|---|---|---|
| rating_region_table_section () { | | |
|     table_id | 8 | 0xCA |
|     section_syntax_indicator | 1 | '1' |
|     private_indicator | 1 | '1' |
|     reserved | 2 | '11' |
|     section_length | 12 | uimsbf |
|     table_id_extension { | | |
|         reserved | 8 | 0xFF |
|         rating_region | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     rating_region_name_length | 8 | uimsbf |
|     rating_region_name_text() | var | |
|     dimensions_defined | 8 | uimsbf |
|     for (i = 0; i < dimensions_defined; i++) { | | |
|         dimension_name_length | 8 | uimsbf |
|         dimension_name_text() | var | |
|         reserved | 3 | '111' |
|         graduated_scale | 1 | bslbf |
|         values_defined | 4 | uimsbf |
|         for (j = 0; j < values_defined; j++) { | | |
|             abbrev_rating_value_length | 8 | uimsbf |
|             abbrev_rating_value_text() | var | |
|             rating_value_length | 8 | uimsbf |
|             rating_value_text() | var | |
|         } | | |
|     } | | |
|     reserved | 6 | uimsbf |
|     descriptors_length | 8 | uimsbf |
|     for (i = 0; i < N; i++) { | | |
|         descriptor | | |
|     } | | |
|     CRC_32 | 32 | rpchof |
| } | | |

FIG. 4

Format of the Content Advisory Descriptor. Source: ATSC A/65b (PSIP Specification)

| Syntax | No. of bits | Format |
|---|---|---|
| content_advisory_descriptor () { | | |
| descriptor_tag | 8 | 0x87 |
| descriptor_length | 8 | uimsbf |
| reserved | 2 | '11' |
| rating_region_count | 6 | |
| for (i = 0; i < rating_region_count; i++) { | | |
| rating_region | 8 | uimsbf |
| rated_dimensions | 8 | uimsbf |
| for (j = 0; j < rated_dimensions; j++) { | | |
| rating_dimension_j | 8 | uimsbf |
| reserved | 4 | '1111' |
| rating_value | 4 | uimsbf |
| } | | |
| rating_description_length | 8 | uimsbf |
| rating_description_text() | var | |
| } | | |
| } | | |

FIG.7

CHANNEL MAP OF ANTENNA A

| PHYSICAL CHANNEL | VIRTUAL MAIN CHANNEL | V-CHIP-2.0 INFORMATION ACQUISITION FLAG | VIRTUAL SUB-CHANNEL | | | | |
|---|---|---|---|---|---|---|---|
| | | | 1 | 2 | 3 | . . . | 99 |
| 2 | 8 | O | - | O | - | . . . | - |
| 4 | 10 | | - | - | - | | - |
| 8 | 9 | O | - | - | O | | - |
| 14 | 4 | O | - | O | - | | - |

FIG.8

CHANNEL MAP OF ANTENNA B

| PHYSICAL CHANNEL | VIRTUAL CHANNEL | V-CHIP-2.0 INFORMATION ACQUISITION FLAG | 1 | 2 | 3 | ... | 99 |
|---|---|---|---|---|---|---|---|
| 3 | 4 | × | – | – | – | – | – |
| 4 | 10 | ○ | – | ○ | – | – | – |
| 20 | 43 | × | – | – | – | – | – |
| 40 | 5 | × | – | – | – | – | – |

DIGITAL BROADCASTING RECEIVING DEVICE

CROSS-REFERENCES TO RELATED APPLICATIONS

The present application is related to the Japanese Patent Application No. 2006-326861, filed Dec. 4, 2006, the entire disclosure of which is expressly incorporated by reference herein.

BACKGROUND OF THE INVENTION

1. Field of the Invention

The present invention relates to a digital broadcasting receiving device, and particularly to a digital broadcasting receiving device having a viewing restriction function.

2. Description of Related Art

In United States and Canada, a regulation requires that television sets which receive television broadcast signals must have a V-chip allowing a viewer to restrict reception and display of improper video and sound of violence scenes and obscene images which are desired not to be watched by children. Specifically, with a conventional V-chip defined by CEA-766-A, each television set stores a rating region table (hereinafter, referred to as "fixed RRT") which includes predetermined TV rating and MPAA rating, and viewing restriction is applied based on the fixed RRT.

However, in order to change or expand the rating region table, the Federal Communications Commission has required since Mar. 15, 2006 that a digital television broadcasting receiving device having the size of 13 inch or more include a V-chip 2.0. With the V-chip 2.0, the digital television broadcasting receiving device can recognize a rating region table (hereinafter, referred to as "variable RRT") sent during broadcasting and apply program viewing restriction.

Also, with the V-chip 2.0, rating information of each program is sent together with the broadcast signal in the same way as with the conventional V-chip, and viewing restriction is applied based on a combination of the rating information and the fixed RRT or the variable RRT.

As a technique of using rating information in the conventional V-chip, JP 2003-198974 A discloses a technique in which the rating information of a channel being tuned is accumulated in association with program titles or the like to allow a user to refer to the rating information upon rating setting. Further, JP 2003-518881 A discloses a technique of obtaining, while one channel is being viewed, the rating information of another channel for the purpose of preventing a reduction in the speed of channel zapping caused by rating-information acquisition and decision processing. Further, JP 2003-110953 A discloses a technique of applying viewing restriction based on rating information for multiple days that is sent together with an EPG, to prevent a program to which viewing restriction should be applied from being displayed during a period of time required for rating-information acquisition and decision processing immediately after channel switching.

A device for receiving television broadcasting has a channel map that associates the number of each physical channel specified by a user through a key operation with the number of each logical channel assigned to the frequency band of a broadcast signal. In the channel map, if the number of a logical channel is not assigned to the number of a physical channel, video is not displayed even when the user selects that physical channel. However, when the user performs a key operation, the user expects some video to be displayed.

BRIEF SUMMARY OF THE INVENTION

The present invention provides a technique of displaying some video when the user selects a physical channel with which a logical channel is not associated, in a digital television broadcasting receiving device having a V-chip 2.0.

According to the present invention, there is provided a digital broadcasting receiving device including: a recording medium that stores a channel association table in which a number of a logical channel corresponding to a broadcast signal is associated with a physical channel; an operation input section that selects the logical channel based on the channel association table in response to an external operation input; a list acquisition section that obtains a list of a viewing rank from a digital television broadcast signal and stores the list in the recording medium in association with the logical channel; a restriction item setting section that specifies an item in the list as a viewing restriction item based on an external operation input; a viewing restriction section that applies viewing restriction to the broadcast signal when the viewing rank indicates the viewing restriction item in the list; and an alternative channel tuning section that tunes, as an alternative channel, a physical channel with which a logical channel is associated in the channel association table when a logical channel is not associated with the selected physical channel, when the physical channel with which the number of the logical channel is associated is selected, a broadcast signal of the logical channel associated with the physical channel is tuned based on the channel association table, a viewing rank specified for the broadcast signal is obtained, and viewing restriction is applied to the broadcast signal according to the viewing rank; and when the alternative channel is tuned, the viewing restriction section applies viewing restriction to the broadcast signal based on a list associated with the alternative channel.

According to the above-described configuration, the list acquisition section obtains a list of the viewing rank from a digital television broadcast signal and stores the list in the recording medium in association with the logical channel; the restriction item setting section specifies an item in the list as a viewing restriction item based on an operation input from a user; the viewing restriction section applies viewing restriction to the broadcast signal when the viewing rank indicates the viewing restriction item in the list; and when a logical channel is not associated with a selected physical channel, the alternative channel tuning section tunes, as an alternative channel, a physical channel with which a logical channel has been associated in the channel association table. When the alternative channel is tuned, the viewing restriction section applies viewing restriction to the broadcast signal based on a list associated with the alternative channel.

According to the present invention, when the user selects a physical channel with which a logical channel is not associated, video and sound of an alternative channel are output to respond to the expectation of the user, and appropriate viewing restriction can be applied by associating a list of a viewing rank of the alternative channel with the physical channel selected by the user.

The channel association table and the list may be stored in an identical recording medium or may be stored separately. Viewing restriction is applied to video display and/or sound output performed based on a television broadcast signal, and restriction may be applied partially or entirely. According to the configuration, when the user selects a physical channel with which a logical channel is not associated, video and sound of an alternative channel are output to respond to the expectation of the user, and appropriate viewing restriction can be applied by associating a list of a viewing rank of the alternative channel with the physical channel selected by the user.

In another aspect of the present invention, the digital broadcasting receiving device may be configured such that two kinds of broadcast signal input systems are provided; and when a logical channel is not associated with a physical channel selected in one of the broadcast signal input systems, the alternative channel tuning section tunes, as an alternative channel, a physical channel with which a logical channel has been associated in the other one of the broadcast signal input systems.

With the configuration in which the two kinds of broadcast signal input systems complement each other, a possibility that a logical channel used as the alternative channel matches a channel in the broadcast signal input system to which the selected physical channel belongs becomes lower. Therefore, various choices can be provided for the user.

In another aspect of the present invention, the digital broadcasting receiving device may be configured such that, when a logical channel is not associated with the selected physical channel, the alternative channel tuning section tunes, as an alternative channel, a physical channel having a channel number closest to that of the selected physical channel, among physical channels with which logical channels have been associated in the channel association table.

When the user fails to select a desired physical channel and selects an adjacent physical channel with which a logical channel is not associated, a possibility to select the channel desired by the user becomes higher while video and sound are output to respond to the expectation of the user.

In another aspect of the present invention, the digital broadcasting receiving device may further include an association relationship storage section which stores in the recording medium, when an alternative channel is tuned by the alternative channel tuning section, the alternative channel and a list of the alternative channel in association with the physical channel selected by the operation input section.

When an alternative channel is tuned by the alternative channel tuning section, the alternative channel and the list associated with the alternative channel are stored in the recording medium, so that the list can be used when the same physical channel is selected next.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character (s) present corresponding parts throughout:

FIG. 2 is a diagram showing an example of a configuration of a rating region table (RRT).

FIG. 3 is a diagram showing an example of a section structure of the RRT.

FIG. 4 is a diagram showing an example of a section structure of a content advisory descriptor (CAD).

FIG. 7 is a diagram showing an example of a channel map of terrestrial digital television broadcasting.

FIG. 8 is a diagram showing an example of a channel map of digital cable television broadcasting.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. For example, such variations and alternate embodiments are contemplated, and can be made without departing from the spirit and scope of the invention.

Hereinafter, an embodiment of the present invention will be described in the following order.

1. Configuration of Digital Broadcasting Receiving Device
2. Information on Viewing Restriction
3. Channel Map
4. Channel-Selection Processing of Microcomputer
5. Conclusion 1. Configuration of Digital Broadcasting Receiving Device Hereinafter, the embodiment of the present invention will be described with reference to FIGS. 1 to 9. In this embodiment, a digital television set which receives digital television broadcasting and displays video corresponding to the received broadcast signal on a screen will be described as a digital broadcasting receiving device. The display section is not necessarily provided as a part of the digital television set. Of course, a combination set that also has a reproducing device and a recording device for recording media may be used.

Figure 1:
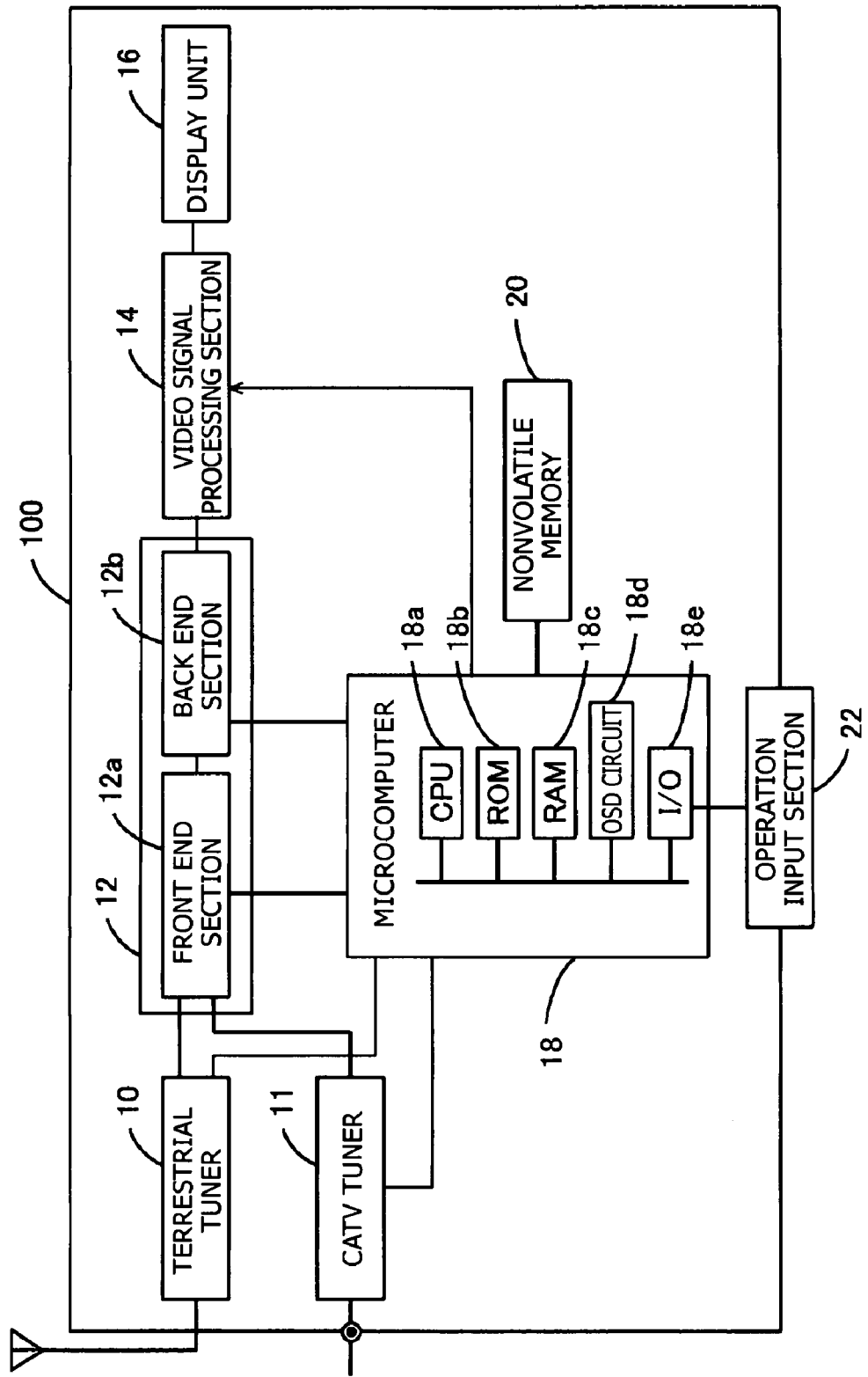
FIG. 1 is an example of a schematic block configuration diagram of a digital television set.

FIG. 1 is a schematic block configuration diagram of a digital television set (digital broadcasting receiving device) 100. In FIG. 1, the digital television set 100 includes a terrestrial tuner 10 which receives terrestrial digital television broadcasting, a cable television (CATV) tuner 11 which receives digital cable television broadcasting, a microcomputer 18, a digital demodulation circuit 12, a video signal processing section 14, a display unit 16, a nonvolatile memory 20, and an operation input section 22.

The microcomputer 18 is electrically connected to the above-mentioned components, and controls an operation of the entire digital television set 100. The microcomputer 18 includes a CPU 18a, a ROM 18b, a RAM 18c, an OSD circuit 18d, and an input/output (I/O) circuit 18e. In the microcomputer 18, the CPU 18a uses the RAM 18c as a work area and controls the operation of the digital television set 100 based on a program or data stored in the ROM 18b.

Under the control of the CPU 18a, the microcomputer 18 receives a voltage signal input to the input/output circuit 18e from the operation input section 22 and generates an onscreen display (OSD) signal corresponding to the received operation input. For example, the microcomputer 18 generates an OSD signal for displaying predetermined operation items on a screen of the display unit 16, receives, from the operation input section 22, an operation input indicating a selection among the operation items displayed on the screen, and performs setting processing corresponding to the selected operation item.

The terrestrial tuner 10 and the CATV tuner 11 have so-called synthesizer configurations. Each of the terrestrial tuner 10 and the CATV tuner 11 receives PLL data serving as a channel-selection control signal, that is, the frequency dividing ratio of a variable frequency divider circuit in a PLL. Upon reception of PLL data sent from the microcomputer 18, each of the terrestrial tuner 10 and the CATV tuner 11 extracts the intermediate frequency signal (IF) of a desired frequency band from the broadcast signals corresponding to the channels of digital television broadcasting received through an antenna, and sends the intermediate frequency signal to the digital demodulation circuit 12. Accordingly, each of the terrestrial tuner 10 and the CATV tuner 11 selects one channel from multiple channels.

The microcomputer 18 performs control processing by receiving, through the input/output circuit 18e, a voltage signal input from the operation input section 22. For example, when a channel switch signal is input from the operation input section 22, the microcomputer 18 recognizes the channel to be selected and sends a channel selection control signal for receiving the television broadcast signal of the selected channel, to the terrestrial tuner 10 or the CATV tuner 11. Further, when a select signal for displaying a setting screen is input, the microcomputer 18 causes the OSD circuit 18d to generate an OSD signal based on image information and character information and outputs the OSD signal to the video signal processing section 14 to display it on the display unit 16 (ODS display). While viewing the OSD display, the user can specify various settings through operation inputs. The microcomputer 18, which specifies settings based on a voltage signal input from the operation input section 22, also serves as an operation input section.

The digital demodulation circuit 12 includes a front end section 12a and a back end section 12b. The front end section 12a includes a digital interface which receives the intermediate frequency signal, and a demodulation section which receives a signal from the digital interface. The digital interface has an analog-to-digital converter, and the demodulation section has a channel equalizer and an error-correcting decode section. Specifically, the digital interface and the demodulation section convert the input intermediate frequency signal into a digital signal, and apply so-called ghost cancellation to the demodulated digital signal based on control information sent from the microcomputer 18. Further, the digital interface and the demodulation section correct a bit error which may occur on a transmission path and obtain a transport stream (TS) signal.

The TS signal is output to the back end section 12b. The back end section 12b includes a descramble section, a demultiplex section, and an MPEG decoder. Since the TS signal is generally scrambled, video and sound cannot be properly reproduced from it. Thus, the descramble section applies descramble processing to the TS signal to obtain a reproducible data arrangement. The TS signal, to which the descramble processing has been applied, includes a video signal, a sound signal, and character information in a multiplexing manner, and is sent to the demultiplex section. In the demultiplex section, demultiplex processing is applied to the input data. In other words, the TS signal is demultiplexed.

The TS signal is demultiplexed in the demultiplex section to generate MPEG data in which the video signal and the sound signal are compressed by a predetermined method. The MPEG data is sent to the MPEG decoder. In the MPEG decoder, decompression processing, that is, MPEG decode processing, is performed. Through the MPEG decode processing, the digital video signal and the digital sound signal are generated. The digital video signal is output to the video signal processing section 14. On the other hand, the digital sound signal is converted into an analog sound signal by a predetermined digital-to-analog converter, and the analog sound signal is output to a speaker (not shown).

Upon reception of the digital video signal, the video signal processing section 14 applies predetermined signal processing to the digital video signal and then outputs the resultant digital video signal to the display unit 16. As the display unit 16, various types of video display devices can be used, such as a CRT, a liquid crystal panel, and a plasma display panel. In this embodiment, a description is given by taking a liquid crystal panel as an example.

The video signal processing section 14 includes a pixel-count conversion circuit, an image-quality adjustment circuit, and an output processing circuit. The pixel-count conversion circuit receives the digital video signal, applies scaling processing to the digital video signal, and generates an RGB signal for one screen to be displayed on the liquid crystal panel. The image-quality adjustment circuit applies various kinds of adjustment, such as brightness, contrast, black balance and white balance, and sharpness adjustment, to the RGB signal, to which the scaling processing has been applied by the pixel-count conversion circuit. The output processing circuit applies gamma correction and dither processing to the RGB signal, to which the image-quality adjustment has been applied, adds a background signal, an OSD signal, a blanking signal to the RGB signal, and outputs it to the liquid crystal panel to display the image.

The display unit 16 includes the liquid crystal panel, for example, and a drive circuit for driving the liquid crystal panel. The drive circuit generates a driving signal based on the video signal input from the video signal processing section 14 and drives the pixels of the liquid crystal panel by using the driving signal. Of course, the display unit 16 may be a plasma display panel having a drive circuit, or an image receiving tube driven by a vertical deflection circuit and a horizontal deflection circuit.

2. Information on Viewing Restriction

A TS signal includes program specific information protocol (PSIP) data as service information. The PSIP data includes an event information table (EIT) having program information, such as the name of each program, the broadcasting date and time, and an explanation of the program content, and a rating region table (RRT) having V-chip rating information (viewing rank). In the nonvolatile memory 20, a rating region table (RRT) of V-chip rating information is stored in advance with shipment. The nonvolatile memory 20 serves as a recording medium. Hereinafter, the RRT included in a TS signal is referred to as "variable RRT", and the RRT stored in advance in the nonvolatile memory 20 is referred to as "fixed RRT". The microcomputer 18, which obtains a variable RRT from a TS signal, also serves as a list acquisition section.

FIG. 2 shows a configuration example of an RRT. A variable RRT and a fixed RRT have basically the same configuration. The variable RRT is different from the fixed RRT in that, in the variable RRT, the number of items and the number of levels for each item can be increased or decreased depending on a broadcasting station. The RRT includes a rating table name, a rating item name, a block type, and a level name. The rating table name indicates the name of each RRT. A rating item is generated depending on how to specify viewing restriction. For example, when viewing restriction is specified for a particular area, the rating item name indicates the name of the area. When viewing restriction is specified for a particular broadcasting station, the rating item name indicates the name of the broadcasting station. The block type is either a category type or an order type. When the category type is specified, a predetermined keyword indicating the broadcasting content is given as the level name for an item, and viewing restriction enable/disable can be specified for each level. On the other hand, when the order type is specified, a name (such as age) which can be sequentially listed is given as the level name for an item. When the level increases, the level of restriction is also increased stepwise. Therefore, in an item of the order type, when viewing restriction enable is specified for a particular level, viewing restriction enable is also specified for all levels below the particular level.

A variable RRT is individually generated and sent by a broadcasting station. The microcomputer 18 can extract the variable RRT from a TS signal at predetermined timing and store the variable RRT in the nonvolatile memory 20. The obtained variable RRT is stored in the nonvolatile memory 20 in association with the channel from which the variable RRT is obtained. On the other hand, in the fixed RRT, which is recorded in the nonvolatile memory 20 in advance with shipment, the table content is not changed unlike the variable RRT conforming to the V-chip 2.0. In general, the fixed RRT includes TV rating, which defines viewing restriction applied to a television broadcast signal, and an MPAA rating, which specifies viewing restriction applied to video to be reproduced from a recording medium such as a DVD.

The EIT includes a descriptor called content advisory descriptor (CAD). The CAD describes rating information (viewing rank) indicating an RRT, an item, and a level at which viewing restriction is applied. Further, the CAD has an identifier indicating an RRT version based on which viewing restriction is applied. The identifier is associated with either the fixed RRT or the variable RRT. Depending on whether this identifier matches the identifier of the fixed RRT or the identifier of the variable RRT, it is determined whether the fixed RRT or the variable RRT is used for viewing restriction. Specifically, the identifier of the CAD is compared with the identifier of the variable RRT. When they match, the variable RRT is used for viewing restriction. When they do not match, the fixed RRT is used for viewing restriction.

FIG. 3 shows a section structure of an RRT. FIG. 4 shows a section structure of a CAD. In FIG. 3, "rating_region" stores the identifier of a variable RRT, "rating region_name_text( )" stores the table name of the variable RRT, "dimension_name_text( )" stores an item name of the variable RRT, and "rating value name( )" stores a level name of the variable RRT. In FIG. 4, "rating_region" stores the identifier corresponding to either the fixed RRT or the variable RRT. Thus, by comparing "rating_region" of the RRT with "rating_region" of the CAD, an RRT to be used for viewing restriction can be determined.

Figure 5:
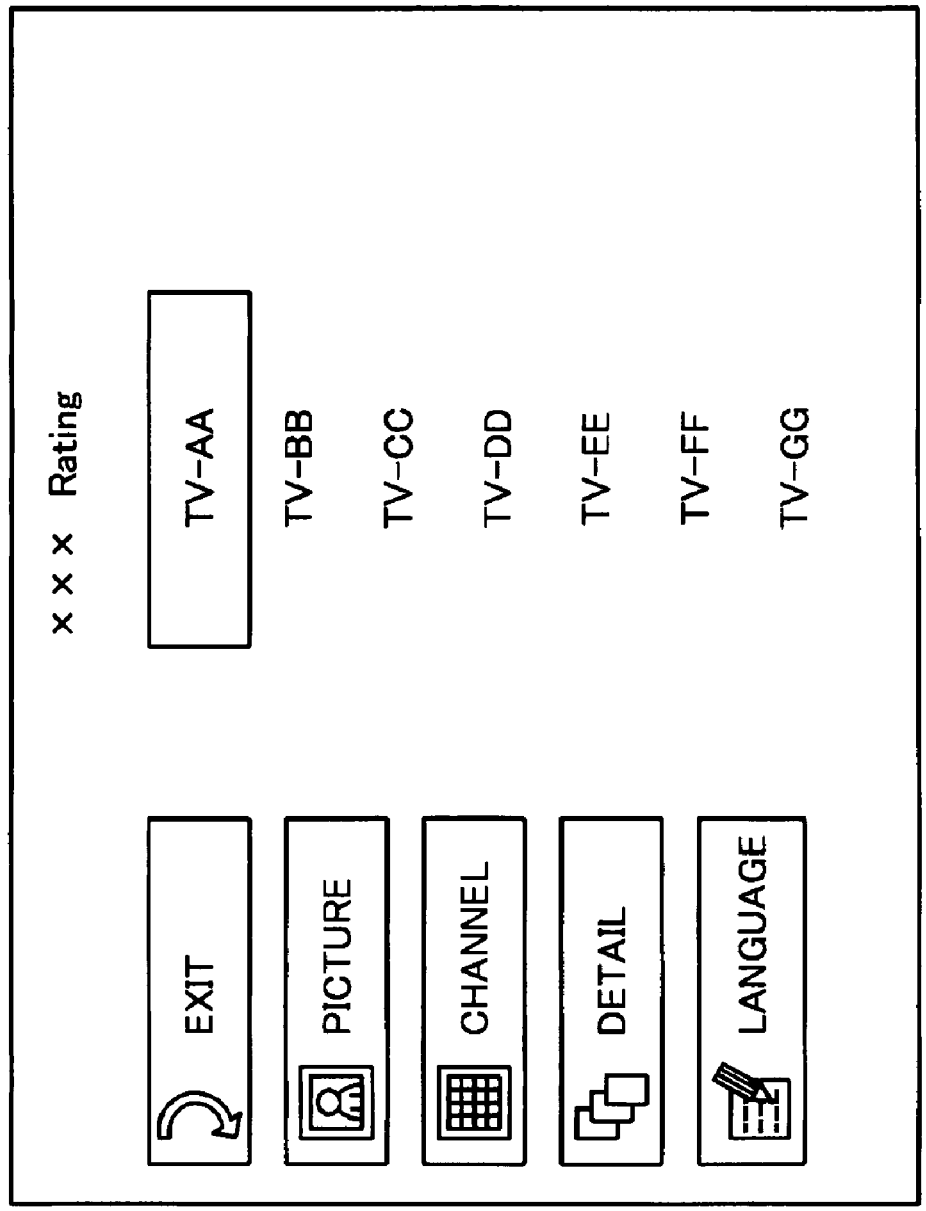
FIG. 5 is a diagram showing an example of a screen for setting a viewing restriction enable flag.
Figure 6:
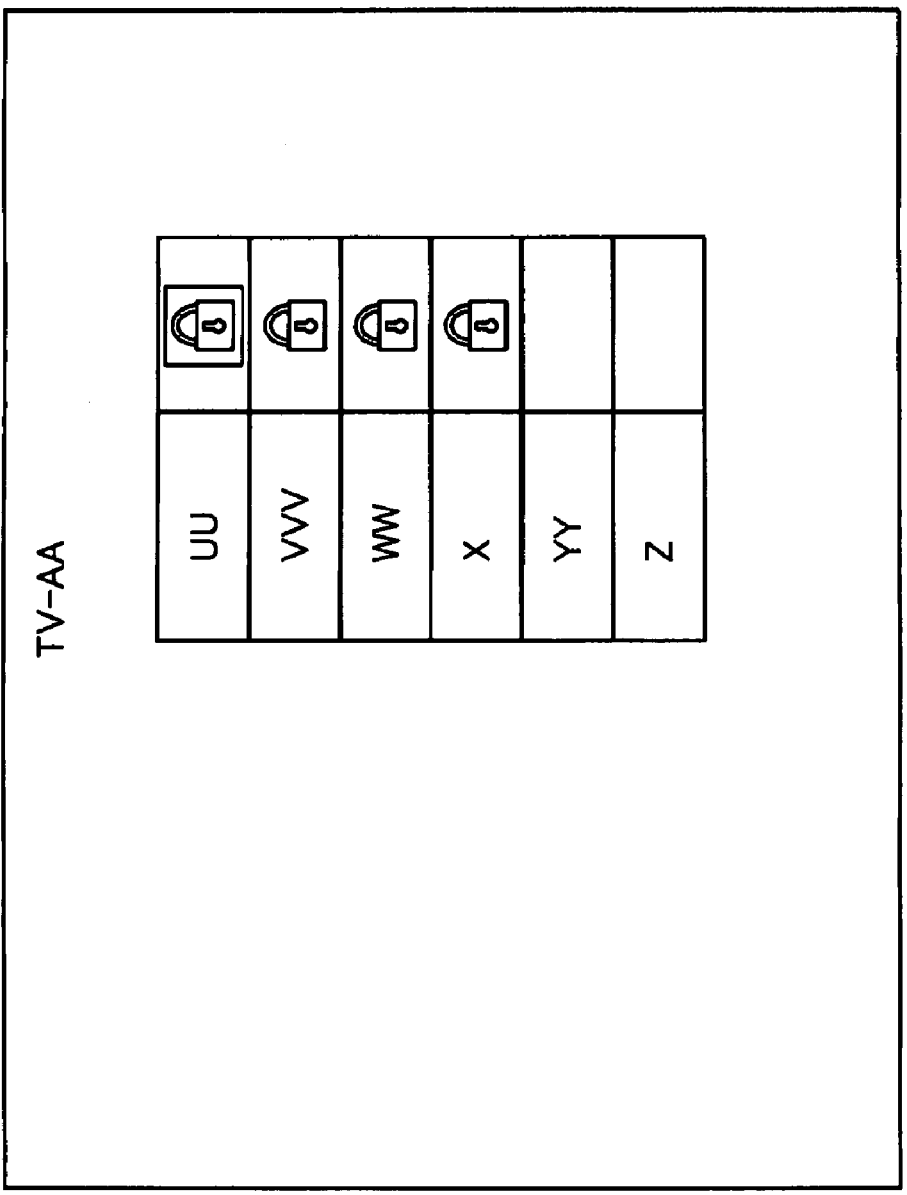
FIG. 6 is a diagram showing an example of a screen for setting a viewing restriction enable flag.

Further, the user specifies, at each level for each item in each RRT, whether to apply viewing restriction when the level is specified by the rating information. The setting as to whether to apply viewing restriction is specified by the user when each level for each item is specified by the rating information on an RRT setting screen. Specifically, when the user performs a predetermined operation input, an RRT item selection screen is displayed as shown in FIG. 5. When any item shown in FIG. 5 is selected and input, a screen for setting whether to apply viewing restriction at each level is displayed as shown in FIG. 6. In this way, an item for which viewing restriction is specified by the user is a viewing restriction item.

Each level is assigned with a name which clearly shows the content of viewing restriction to be applied at the level. The user views the name, determines the level at which the user wants to apply viewing restriction, and sets a viewing restriction enable flag at the desired level. Accordingly, when CAD rating information specifies a level at which a viewing restriction enable flag has been set, viewing restriction is applied. When CAD rating information specifies a level at which a viewing restriction enable flag has not been set, viewing restriction is not applied. The microcomputer 18, which performs processing of program viewing restriction based on the variable RRT, the fixed RRt, and the rating information, as described above, serves as a viewing restriction section. The microcomputer 18, which performs processing of setting a viewing restriction enable flag at each level in an RRT based on a user's operation input, as described above, also serves as a restriction item setting section.

3. Channel Map

The nonvolatile memory 20 stores a channel map. FIG. 7 shows an example cannel map of terrestrial digital television broadcasting. FIG. 8 shows an example cannel map of digital cable television broadcasting. The channel maps are used as channel association tables.

Each channel map includes the channel number of each physical channel, the channel number of each virtual main channel, an information acquisition flag indicating whether a variable RRT of the V-chip 2.0 has been obtained, and information indicating a virtual sub-channel at which broadcasting can be received among virtual sub-channels belonging to each virtual main channel. The virtual main channel and the virtual sub-channel correspond to logical channels.

In FIG. 7, a virtual main channel 10 associated with a physical channel 4 has not been registered because a broadcast signal was not detected upon generation of the channel map, and thus, an information acquisition flag has not been set. On the other hand, in FIG. 8, the virtual main channel 10 associated with the physical channel 4 has been registered because a broadcast signal was detected upon generation of the channel map, and thus, a V-chip-2.0 information acquisition flag has been set.

If there is an unregistered physical channel as in FIG. 7, when the user selects that physical channel, nothing is displayed, a screen full of noise is displayed, or the channel selection is made invalid. However, since the user selects a channel to expect that something is displayed, a response to the channel selection can be improved.

4. Channel-Selection Processing of Microcomputer

Figure 9:
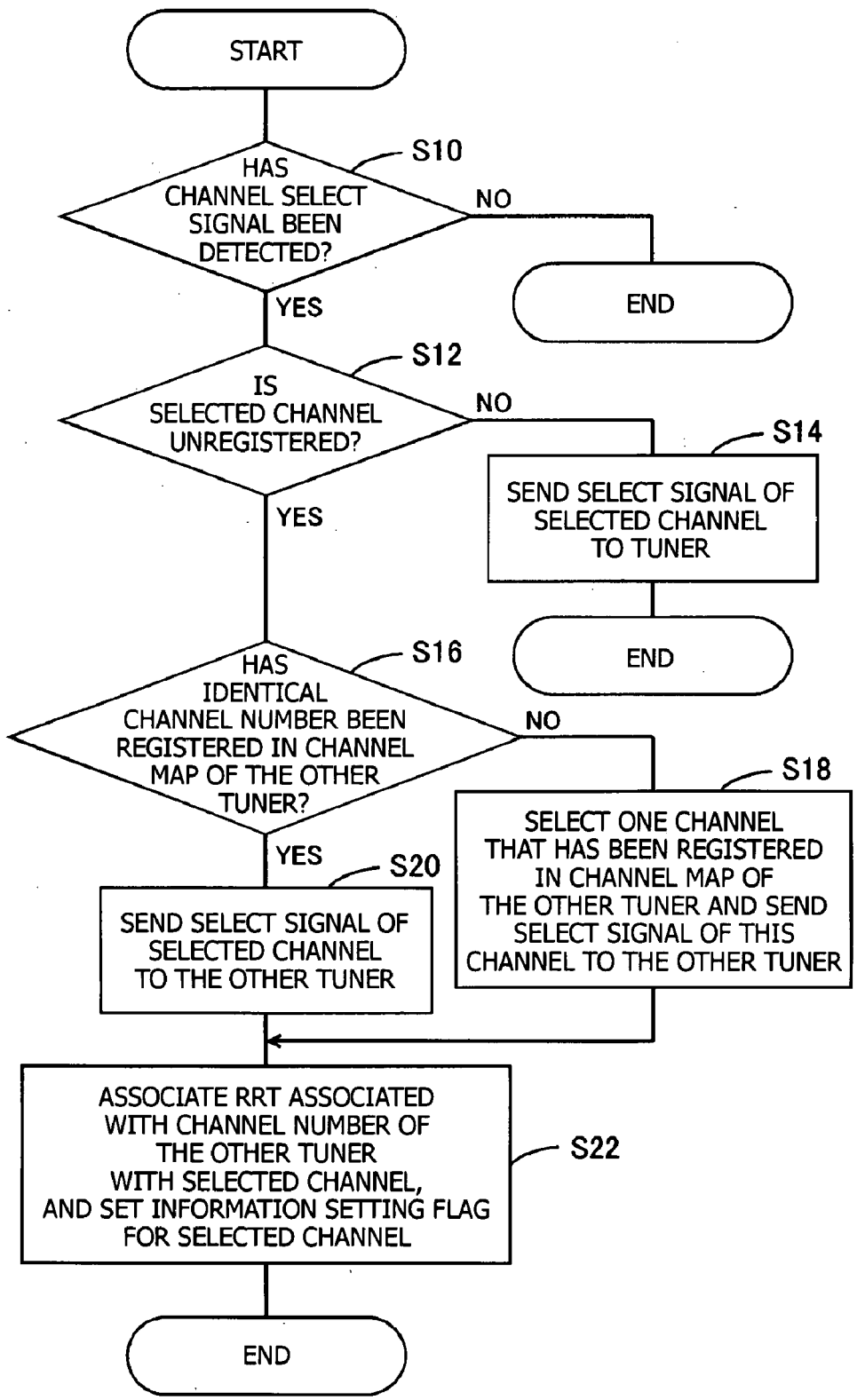
FIG. 9 is a flowchart showing an example of channel-selection processing of a microcomputer.

Hereinafter, channel-selection processing of the microcomputer 18 will be described with reference to a flowchart of FIG. 9. The processing is repeatedly performed while the digital television set is turned on. The following description will be given on the assumption that a channel is selected while terrestrial digital broadcasting is being selected. Of course, a channel may be selected while digital cable television broadcasting is being received. In that case, channel selection is realized by switching a configuration handling terrestrial digital broadcasting to a configuration handling digital cable television broadcasting.

When the processing is started, it is determined in Step S10 whether a channel select signal has been detected. Specifically, when the user operates the operation input section 22 to select a desired channel, a voltage signal indicating the channel selection is input to the input/output circuit 18e from the operation input section 22. Then, the microcomputer 18 receives the voltage signal and determines which physical channel has been selected. When a channel select signal has been detected, this indicates an affirmative judgment, and the processing advances to Step 12. When a channel select signal has not been detected, this indicates a negative judgment, and the processing is ended.

In Step S12, it is determined whether the selected physical channel is unregistered. Specifically, the terrestrial channel map is referenced to determine whether a virtual channel has been associated with the selected physical channel. When the selected physical channel is unregistered, this indicates an affirmative judgment, and the processing advances to Step S16. When the selected physical channel is not unregistered, this indicates a negative judgment, and the processing advances to Step S14.

In Step S14, the selected channel is tuned. Specifically, a channel select signal for selecting the virtual channel (virtual main channel or virtual sub-channel) associated with the selected physical channel in the terrestrial channel map is output to the terrestrial tuner 10, and the processing is ended.

In Step S16, it is determined whether a physical channel having the same number as the channel selected in Step S10 has been registered in the channel map of the other tuner. Specifically, the CATV channel map is referenced to determine whether a virtual channel has been associated with the selected physical channel. When a physical channel having the same number has been registered, this indicates an affirmative judgment, and the processing advances to Step S20. When a physical channel having the same number has not been registered, this indicates a negative judgment, and the processing advances to Step S18.

In Step S18, one channel which has been registered in the channel map of the other tuner is selected, the channel is tuned, and the processing advances to Step S22. Specifically, the CATV channel map is referenced to select one registered physical channel, and a channel select signal of the selected channel is output to the CATV tuner. The physical channel selected in Step S18 may be any channel as long as it has been registered, and the channel selection method is appropriately determined at the time of design. Accordingly, through the selection of a channel which has not been registered in the channel map of terrestrial digital television broadcasting, a channel for digital cable television is selected and the video signal is displayed on the screen.

In Step S20, the selected channel which has been registered in the channel map of the other tuner is tuned, and the processing advances to Step S22. Specifically, the channel select signal of a virtual channel associated, in the CATV channel map, with a physical channel having the same number of the channel selected in Step S10 is output to the CATV tuner 11. Accordingly, through the selection of a channel which has not been registered in the channel map of terrestrial digital television broadcasting, a channel for digital cable television is selected and the video signal is displayed on the screen.

In Step S22, a variable RRT associated with the channel number of the other tuner is associated with the selected channel, and the processing is ended. Specifically, a variable RRT associated with the channel tuned in Step S18 or S20, in the CATV channel map, is associated with the physical channel selected in Step S10, of terrestrial digital television broadcasting, and the V-chip-2.0 information acquisition flag of the physical channel is set on. At the same time, a logical channel associated with the channel number of the other tuner may be stored in association with the physical channel. In this way, when an unregistered physical channel is selected and video from the other tuner is displayed, viewing restriction appropriate for the displayed video can be set.

In Steps S18 and S20, an alternative channel is selected from the other tuner. Of course, it is needless to say that an object of the present invention can also be achieved when an alternative channel is selected from the tuner of the selected physical channel.

The microcomputer 18 serves as an association relationship storage section when executing the process of Step S22. The microcomputer 18 serves as an alternative channel tuning section when executing the processes of Steps S10 to S20.

5. Conclusion

The microcomputer 18 obtains a variable RRT from a broadcast signal and stores, in a recording medium, the variable RRT in association with a physical channel; sets a viewing restriction flag for an item in the variable RRT based on an operation input from a user; applies viewing restriction to the broadcast signal when rating information indicates the level at which the viewing restriction flag has been set in the variable RRT; and, when a logical channel is not associated with a selected physical channel, tunes, as an alternative channel, a physical channel with which a logical channel has been associated in the channel map of the other tuner, and associates a variable RRT associated with the alternative channel, with the selected physical channel. Therefore, some video is displayed when the user selects a physical channel with which a logical channel is not associated, in the digital television broadcasting receiving device having a V-chip 2.0.

As a concrete example of the present invention, there is provided a digital broadcasting receiving device, including: a terrestrial tuner that receives terrestrial digital television broadcasting; a cable television tuner that receives digital cable television broadcasting; a recording medium that stores a terrestrial channel map and a cable television channel map in each of which number of a logical channel corresponding to a broadcast signal has been associated with a physical channel; and a microcomputer that outputs, in response to an external operation input (from a user), a channel select signal for selecting a logical channel based on the terrestrial channel map to the terrestrial tuner when receiving the terrestrial digital television broadcasting, which outputs, in response to an external operation input, a channel select signal for selecting a logical channel based on the cable television channel map to the cable television tuner when receiving the digital cable television broadcasting, and which obtains, while outputting a channel select signal for a broadcast signal corresponding to a logical channel associated with a selected physical channel, rating information specified for the broadcast signal and applies viewing restriction to the broadcast signal according to the rating information, the microcomputer obtains a variable rating region table having a list of ratings of the rating information from the broadcast signal and stores, in the recording medium, the variable rating region table in association with the physical channel; displays the variable rating region table on a screen and sets a viewing restriction flag for an item in the variable rating region table based on an external operation input; applies viewing restriction to the broadcast signal when the rating information indicates a level at which the viewing restriction flag has been set in the variable rating region table; and when a logical channel is not associated with the selected physical channel in one of the terrestrial channel map and the cable television channel map, tunes, as an alternative channel, a physical channel with which a logical channel has been associated in the other channel map and associates a variable rating region table associated with the alternative channel, with the selected physical channel.

It is needless to say that the present invention is not limited to the above-described embodiment. It is also needless to say for those skilled in the art that the following changes also serve as embodiments of the present invention:

Appropriately changing a combination of the members and configurations replaceable with each other and disclosed in the above-described embodiment;

Appropriately replacing the members and configurations disclosed in the above-described embodiment with members and configurations which are not disclosed in the above-described embodiment but are well-known and can be replaced therewith, or appropriately changing a combination thereof; and Appropriately replacing the members and configurations disclosed in the above-described embodiment with members and configurations which are not disclosed in the above-described embodiment but can be assumed, by those skilled in the art based on well-known art, to be substituted therefor.

While the invention has been particularly shown and described with respect to a preferred embodiment thereof, it should be understood by those skilled in the art that the foregoing and other changes in form and detail may be made therein without departing from the sprit and scope of the invention as defined in the appended claims.

What is claimed is:

1. A digital broadcasting receiving device, comprising:
a terrestrial tuner that receives terrestrial digital television broadcasting;
a cable television tuner that receives digital cable television broadcasting;
a recording medium that stores a terrestrial channel map and a cable television channel map in each of which number of a logical channel corresponding to a broadcast signal has been associated with a physical channel; and
a microcomputer that outputs, in response to an external operation input for selecting a physical channel, a channel select signal for selecting a logical channel based on the terrestrial channel map to the terrestrial tuner when receiving the terrestrial digital television broadcasting, which outputs, in response to an external operation input for selecting a physical channel, a channel select signal for selecting a logical channel based on the cable television channel map to the cable television tuner when receiving the digital cable television broadcasting, and which obtains, while outputting a channel select signal for selecting a logical channel associated with the selected physical channel, rating information specified for a broadcast signal corresponding to the channel select signal and applies viewing restriction to the broadcast signal according to the rating information,
the microcomputer
obtains a variable rating region table having a list of ratings of the rating information from the broadcast signal and stores, in the recording medium, the variable rating region table in association with the logical channel;
displays the variable rating region table on a screen and sets a viewing restriction flag for an item in the variable rating region table based on an external operation input;
applies viewing restriction to the broadcast signal when the rating information indicates a level at which the viewing restriction flag has been set in the variable rating region table ; and
when receiving the terrestrial digital television broadcasting,
if a logical channel associated with the selected physical channel is not registered in the terrestrial channel map, determines whether a logical channel associated with a physical channel having a same number as the selected physical channel is registered in the cable television channel map,
when the logical channel associated with the physical channel having the same number as the selected physical channel is registered in the cable television channel map, causes the cable television tuner to select this registered logical channel associated with the physical channel having the same number as the selected physical channel from the cable television channel map,
when the logical channel associated with the physical channel having the same number as the selected physical channel is not registered in the cable television channel map, causes the cable television tuner to select any one of logical channels registered in the cable television channel map, and
stores in the recording medium, the logical channel selected from the cable television channel map and a variable rating region table associated with the logical channel selected from the cable television channel map in association with the selected physical channel;
when receiving the digital cable television broadcasting,
if a logical channel associated with the selected physical channel is not registered in the cable television channel map, determines whether the logical channel associated with the physical channel having the same number as the selected physical channel is registered in the terrestrial channel map,
when the logical channel associated with the physical channel having the same number as the selected physical channel is registered in the terrestrial channel map, causes the terrestrial tuner to select this registered logical channel associated with the physical channel having the same number as the selected physical channel from the terrestrial channel map,
when the logical channel associated with the physical channel having the same number as the selected physical channel is not registered in the terrestrial channel map, causes the terrestrial tuner to select any one of logical channels registered in the terrestrial channel map, and
stores in the recording medium, the logical channel selected from the terrestrial map and a variable rating region table associated with the logical channel selected from the terrestrial channel map in association with the selected physical channel; and
applies viewing restriction to the broadcast signal of the selected logical channel based on the variable rating region table associated with the selected logical channel.

2. A digital broadcasting receiving device, comprising:
a terrestrial tuner that receives terrestrial digital television broadcasting;
a cable television tuner that receives digital cable television broadcasting;
a recording medium that stores a terrestrial channel map and a cable television channel map in each of which a number of a logical channel corresponding to a broadcast signal is associated with a physical channel;

a channel tuning section that causes, in response to an external operation input for selecting a physical channel, the terrestrial tuner to select a logical channel based on the terrestrial channel map when receiving the terrestrial digital television broadcasting, which causes, in response to an external operation input for selecting a physical channel, the cable television tuner to select a logical channel based on the cable television channel map when receiving the digital cable television broadcasting;

a list acquisition section that obtains a list of a viewing rank from a broadcast signal and stores the list in the recording medium in association with the logical channel;

a restriction item setting section that specifies an item in the list as a viewing restriction item based on an external operation input;

a viewing restriction section that obtains a viewing rank specified for a broadcast signal of the selected logical channel and applies viewing restriction to the broadcast signal when the viewing rank indicates the viewing restriction item in the list; and the channel tuning section,
  when receiving the terrestrial digital television broadcasting,
    if a logical channel associated with the selected physical channel is not registered in the terrestrial channel map, determines whether a logical channel associated with a physical channel having a same number as the selected physical channel is registered in the cable television channel map,
    when the logical channel associated with the physical channel having the same number as the selected physical channel is registered in the cable television channel map, causes the cable television tuner to select this registered logical channel associated with the physical channel having the same number as the selected physical channel from the cable television channel map,
    when the logical channel associated with the physical channel having the same number as the selected physical channel is not registered in the cable television channel map, causes the cable television tuner to select any one of logical channels registered in the cable television channel map, and
    stores in the recording medium, the logical channel selected from the cable television channel map and a list of the logical channel selected from the cable television channel map in association with the selected physical channel;
  when receiving the digital cable television broadcasting,
    if a logical channel associated with the selected physical channel is not registered in the cable television channel map, determines whether the logical channel associated with the physical channel having the same number as the selected physical channel is registered in the terrestrial channel map,
    when the logical channel associated with the physical channel having the same number as the selected physical channel is registered in the terrestrial channel map, causes the terrestrial tuner to select this registered logical channel associated with the physical channel having the same number as the selected physical channel from the terrestrial channel map,
    when the logical channel associated with the physical channel having the same number as the selected physical channel is not registered in the terrestrial channel map, causes the terrestrial tuner to select any one of logical channels registered in the terrestrial channel map, and
    stores in the recording medium, the logical channel selected from the terrestrial map and a list of the logical channel selected from the terrestrial channel map in association with the selected physical channel; and the viewing restriction section applies viewing restriction to the broadcast signal of the selected logical channel based on the list associated with the selected logical channel.

* * * * *